(12) United States Patent
Touret et al.

(10) Patent No.: US 11,769,509 B2
(45) Date of Patent: Sep. 26, 2023

(54) SPEECH-BASED CONTEXTUAL DELIVERY OF CONTENT

(71) Applicant: MicroStrategy Incorporated, Vienna, VA (US)

(72) Inventors: Christophe Touret, McLean, VA (US); Eshika Manchanda, McLean, VA (US)

(73) Assignee: MicroStrategy Incorporated, Vienna, VA (US)

( * ) Notice: Subject to any disclaimer, the term of this patent is extended or adjusted under 35 U.S.C. 154(b) by 323 days.

(21) Appl. No.: 16/731,417

(22) Filed: Dec. 31, 2019

(65) Prior Publication Data

US 2021/0201916 A1 Jul. 1, 2021

(51) Int. Cl.
*G10L 17/00* (2013.01)
*G10L 17/06* (2013.01)
*H04L 9/40* (2022.01)
*H04M 3/51* (2006.01)

(52) U.S. Cl.
CPC .............. *G10L 17/00* (2013.01); *G10L 17/06* (2013.01); *H04L 63/08* (2013.01); *H04L 63/105* (2013.01); *H04M 3/5183* (2013.01)

(58) Field of Classification Search
None
See application file for complete search history.

(56) References Cited

U.S. PATENT DOCUMENTS

| | | |
|---|---|---|
| 6,006,242 A | 12/1999 | Poole et al. |
| 6,584,479 B2 | 6/2003 | Chang et al. |
| 7,103,553 B2 * | 9/2006 | Applebaum ........ G10L 15/1822 704/235 |
| 7,827,527 B1 | 11/2010 | Chiluvuri |
| 8,413,045 B2 | 4/2013 | Lemonik et al. |
| 8,539,336 B2 | 9/2013 | Griffiths et al. |
| 8,782,552 B2 | 7/2014 | Batman et al. |
| 9,210,262 B1 * | 12/2015 | Koster ............. G06Q 10/06316 |
| 9,386,152 B2 * | 7/2016 | Riahi .................. H04M 3/5166 |
| 9,412,208 B2 | 8/2016 | Greenberg et al. |
| 9,462,112 B2 * | 10/2016 | Woolsey ........... H04M 1/72433 |
| 9,571,645 B2 * | 2/2017 | Quast ..................... G06Q 10/10 |
| 9,582,154 B2 | 2/2017 | Greenberg et al. |
| 9,582,913 B1 | 2/2017 | Kraft et al. |

(Continued)

FOREIGN PATENT DOCUMENTS

GB 2354851 4/2001

OTHER PUBLICATIONS

"Screenshots Showing Example of Grammarly Web Browser Extension", Aug. 19, 2019, 2 pages.

(Continued)

*Primary Examiner* — Nafiz E Hoque
(74) *Attorney, Agent, or Firm* — Fish & Richardson P.C.

(57) ABSTRACT

In some implementations, one or more computers receive audio data indicating an utterance of a first participant during a call with a second participant. The one or more computers obtain text of the utterance of the first participant. The one or more computers identify an information card associated with the utterance based on the text of the utterance of the first participant. The one or more computers provide information card data causing the identified information card to be provided, for presentation during the call, by a device associated with the second participant.

20 Claims, 5 Drawing Sheets

(56) References Cited

U.S. PATENT DOCUMENTS

| | | | |
|---|---|---|---|
| 10,122,763 B2 | 11/2018 | Lawson et al. | |
| 10,165,015 B2 | 12/2018 | Lawson et al. | |
| 10,230,772 B2 | 3/2019 | Lawson et al. | |
| 10,560,495 B2 | 2/2020 | Lawson et al. | |
| 10,708,424 B1* | 7/2020 | Maestas | H04L 51/36 |
| 10,791,078 B2* | 9/2020 | Bergenlid | H04L 51/10 |
| 2005/0283475 A1* | 12/2005 | Beranek | G06F 16/3334 |
| 2007/0174350 A1 | 7/2007 | Pell et al. | |
| 2008/0104052 A1 | 5/2008 | Ryan et al. | |
| 2008/0195659 A1* | 8/2008 | Rawle | G06Q 90/00 |
| 2008/0209329 A1 | 8/2008 | DeFranco et al. | |
| 2008/0243834 A1 | 10/2008 | Rieman et al. | |
| 2008/0258881 A1 | 10/2008 | Manson et al. | |
| 2009/0164564 A1 | 6/2009 | Willis | |
| 2010/0278453 A1 | 11/2010 | King | |
| 2011/0033036 A1* | 2/2011 | Edwards | G06Q 30/02 379/265.09 |
| 2011/0119165 A1 | 5/2011 | Zee | |
| 2012/0144286 A1 | 6/2012 | Bank et al. | |
| 2012/0278164 A1 | 11/2012 | Spivaek | |
| 2013/0031454 A1 | 1/2013 | Griffiths et al. | |
| 2013/0031457 A1 | 1/2013 | Griffiths et al. | |
| 2013/0159848 A1 | 6/2013 | Banke et al. | |
| 2013/0283194 A1 | 10/2013 | Kopp et al. | |
| 2014/0172418 A1 | 6/2014 | Puppin | |
| 2014/0236978 A1 | 8/2014 | King et al. | |
| 2014/0278349 A1 | 9/2014 | Grieves et al. | |
| 2014/0304365 A1* | 10/2014 | Khanna | H04M 3/42221 709/217 |
| 2014/0365944 A1 | 12/2014 | Moore et al. | |
| 2015/0019221 A1 | 1/2015 | Lee et al. | |
| 2015/0088514 A1* | 3/2015 | Typrin | G06F 3/167 704/249 |
| 2015/0195406 A1* | 7/2015 | Dwyer | G10L 15/26 379/265.07 |
| 2016/0124924 A1 | 5/2016 | Greenberg et al. | |
| 2016/0352891 A1 | 12/2016 | Niu et al. | |
| 2016/0358242 A1* | 12/2016 | Lagos | G06Q 30/02 |
| 2016/0379117 A1 | 12/2016 | Faaborg | |
| 2017/0109334 A1 | 4/2017 | Anglin et al. | |
| 2017/0185375 A1* | 6/2017 | Martel | G06F 40/279 |
| 2018/0113865 A1 | 4/2018 | Najork et al. | |
| 2019/0057165 A1 | 2/2019 | Rosen et al. | |
| 2019/0197916 A1 | 6/2019 | Park | |
| 2019/0220867 A1* | 7/2019 | Karani | H04M 3/42068 |
| 2019/0297186 A1* | 9/2019 | Karani | G06Q 30/01 |
| 2020/0043479 A1* | 2/2020 | Mont-Reynaud | G06F 3/167 |

OTHER PUBLICATIONS community.microstrategy.com [online] "Amazon's Alexa: Key Analytics Applications That Deliver Voice-activated Reporting," May 2017, retrieved on May 21, 2020, retrieved from URL <https://community.microstrategy.com/s/article/Amazon-s-Alexa-Key-Analytics-Applications-That-Deliver-Voice-activated-Reporting?language=en_US>, 4 pages.

community.microstrategy.com [online], "How to Implement Voice-controlled Data Analytics With Amazon's Alexa", May 2017, retrieved on May 21, 2020, retrieved from URL <https://community.microstrategy.com/s/article/How-to-Implement-Voice-controlled-Data-Analytics-With-Amazon-s-Alexa?language=eu_US>, 3 pages.

community.microstrategy.com [online], "HyperVoice and HyperVision," Feb. 2019, retrieved on May 21, 2020, retrieved from URL <https://community.microstrategy.com/s/question/0D544000073QxyCCAS/hypervoice-and-hypervision?language=en_US>.

community.microstrategy.com [online], "What is MicroStrategy HyperIntelligence?," 2019, retrieved on May 21, 2020, retrieved from URL <https://community.microstrategy.com/s/article/KB442388-What-is-MicroStrategy-HyperIntelligence?language=en_US> 12 pages.

Constellationr.com [online], "MicroStrategy Embeds Analytics Into Any Web Interface" Feb. 12, 2019, retrieved on Jan. 15, 2020, retrieved from URL <https://www.constellationr.com/blog-news/microstrategy-embeds-analytics-any-web-interface>, 8 pages.

Css-tricks.com [online], "Extracting Text from Content Using HTML Slot, HTML Template and Shadow DOM," Mar. 6, 2019, retrieved on Jan. 15, 2020, retrieved from URL <https://css-tricks.com/extracting-text-from-content-usmg-html-slot-html-template-and-shadow-dom/>, 6 pages.

Developer.mozilla.org [online], "High-level view," Jan. 29, 2018, retrieved on Jan. 15, 2020, retrieved from URL < https://developer.mozilla.org/en-US/docs/Web/Web_Components/Using_shadow_DOM>, 6 pages.

doughenschen.com [online], "MicroStrategy Embeds Analytics Into Any Web Interface" Feb. 2019, retrieved on May 21, 2020, retrieved from UR: <https://doughenschen.com/2019/02/10/microstrategy-embeds-analytics-into-any-web-interface/>, 6 pages.

eweek.com [online], "MicroStrategy Streamlines Analytics With 'Zero Clicks' UI," Jan. 2019, retrieved on May 21, 2020, retrieved from URL<https://www.eweek.com/enterprise-apps/microstrategy-streamlines-analytics-with-zero-clicks-ui.

Forbes.com [online], "These Ex-Israeli Surveillance Agents Hijack Your Browser to Profit From Ads," Jun. 9, 2015, retrieved on Jan. 15, 2020, retrieved from URL <https//www.forbes.com/sites/thomasbrewster/2015/06/09/from-israel-unit-8200-to-ad-men/#3ff26d7926e2>, 11 pages.

Github.com [online], "Non-invasive way of making highlights—maybe with an overlay? #291," Nov. 30, 2013, retrieved on Jan. 15, 2020, retrieved from URL <https://github.com/openannotation/annotator/issues/291>, 19 pages.

Github.com [online], "Textus," Oct. 27, 2012, retrieved on Jan. 15, 2020, retrieved from URL <https://github.com/okfn/textus>.

Glazkov.com [online], "What the Heck is Shadow DOM?," Jan. 14, 2011, retrieved on Jan. 15, 2020, retrieved from URL <https://glazkov.com/2011/01/14/what-the-heck-is-shadow-dom/>, 43 pages.

idevnews.com [online], "MicroStrategy 2019 Brings AI/ML & Sematic Technologies to BI, Analytics," Feb. 2019, retrieved on May 21, 2020, retrieved from URL <https://www.idevnews.com/stories/7248/MicroStrategy-2019-Brings-AIML-Sematic-Technologies-to-BI-Analytics>, 3 pages.

Lippens, "Amazon's Alexa: Key Analytics Applications That Deliver VoiceActivated Reporting," May 2017, MicroStrategy, 23 pages.

Lippens, "Your Voice is Your Passport: Implementing Voice-driven Applications with Amazon Alexa," 2017, Microstrategy, 33 pages.

Lippens., "How to Implement Voice-controlled Data Analytics With Amazon's Alexa," May 2017, Microstrategy, 4 pages.

Medium.com [online], "Steps to Understanding the Shadow DOM," Feb. 22, 2019, retrieved on Jan. 15, 2020, retrieved from URL <https://medium.com/quick-code/understanding-the-shadow-dom-20e691cc611b>, 22 pages.

microstrategy.com [online], "7 Trending Technology Sessions You Won't Want to Miss at MicroStrategy World 2019," Dec. 2018, retrieved on May 21, 2020, retrieved from URL <https://www.microstrategy.com/us/resources/blog/bi-trends/seven-trending-technology-sessions-at-microstrateg>, 10 pages.

Microstrategy.com [online], "HyperIntelligence", available on or before Jan. 15, 2019, retrieved on Jan. 15, 2020, retrieved from URL <https://www.microstrategy.com/us/product/hyperintelligence>, 3 pages.

microstrategy.com [online], "Microstrategy 2019, the Platform for the Intelligent Enterprise" May 2019, retrieved on May 22, 2020, retrieved from URL <https://www.microstrategy.com/getmedia/4b9fbd76-952b-4da5-8f8d-489278abd59c/MicroStrategy-2019-whitepaper>, 14 pages.

microstrategy.com [online], "Build and Deploy HyperCards Using Workstation," Feb. 2019, retrieved on May 21, 2020, retrieved from URL <https://www.microstrategy.com/getmedia/8103f59b-3416-4a33-bd6a-2e99c9afd474/Build-and-Deploy-HyperCards-Using-Workstation>, 30 pages.

microstrategy.com, [online], "Whats New in Microstrategy 2019", 2019, retrieved on May 21, 2020, retreived from URL <https://www.microstrategy.com/getmedia/de7Ibdb6-6d88-4e62-90d5-0e4a3cf94bb6/whats-new-in-microstrategy-2019>, 138 pages.

(56) References Cited

OTHER PUBLICATIONS

Nicolasleroy.fr [online], "TheFind launches price comparison service", Nov. 19, 2009, retireved on May 14, 2012, retrieved from URL <http://www.nicolasleroy.fr/wp/2009/11/thefind-launches-price-comparison-service/ >, 6 pages.

prnewswire.com "MicroStrategy 2019, the World's Most Advanced Analytics & Mobility Platform, Powers Decisions for Every Moment of the Day" Jan. 2019, retrieved on May 21, 2020, retrieved from URL <https://www.prnewswire.com/in/news-releases/microstrategy-2019-the-world-s-most-advanced-analytics-amp-mobility-platform-powers-decisions-for-every-moment-of-the-day-867142447.html>.

Robdodson.me [online], "Shadow DOM: JavaScript," Sep. 2, 2013, retrieved Jan. 15, 2020, retrieved from URL <https://robdodson.me/shadow-dom-javascript/>, 11 pages.

Solutionsreview.com [online], "MicroStrategy 2019 Features New HyperCards and Federated Analytics," Jan. 7, 2019, retrieved on Jan. 15, 2020, retrieved from URL <https://solutionsreview.com/business-intelligence/microstrategy-2019-features-new-hypercards-and-federated-analytics/>, 4 pages.

Solutionsreview.com [online], "MicroStrategy Extends HyperIntelligence with New Platform Update," Jul. 1, 2019, retrieved on Jan. 15, 2020, retrieved from URL <https://solutionsreview.com/business-intelligence/microstrategy-extends-hyperintelligence-with-new-platform-update/>, 4 pages.

Vibrantmedia.com [online], "FAQs: Vibrant in-Text Advertising," retrieved on Mar. 31, 2011, retrieved from URL <http://www.vibrantmedia.com/in-text_advertising/faq.asp>, 2 pages.

Vibrantmedia.com [online], "In-Text Demo," retrieved on Mar. 31, 2011, retrieved from URL <http://www.vibrantmedia.com/in-text_advertising/demo.asp>, 2 pages.

Wikipedia.com [online], "In-text advertising", Mar. 2017, retrieved on Jan. 15, 2020, retrieved from URL <https://en.wikipedia.org/w/index.php?title=In-text_advertising&oldid=770109369>, 2 pages.

Wikipedia.com [online], "Web Components," Dec. 2017, retrieved on Jan. 15, 2020, retrieved from URL <https://en.wikipedia.org/w/index.php?title=Web_Components&oldid=815726999>, 5 pages.

zdnet.com [online], "MicroStrategy 2019 introduces "HyperIntelligence" contextual BI," Jan. 2019, retrieved on May 21, 2020, retrieved from URL <https://www.zdnet.com/article/microstrategy-2019-brings-introduces-hyperintelligence-contextual-bi/>, 6 pages.

* cited by examiner

SPEECH-BASED CONTEXTUAL DELIVERY OF CONTENT

BACKGROUND

The present specification relates to contextual delivery of content, including delivery of content during voice calls or other communications.

SUMMARY

In some implementations, a computing system can identify keywords spoken on a telephone call, and can dynamically retrieve and present relevant information via a user interface. The information can be presented through digital information cards presented in the user interface. In this manner, users can easily access information that is contextually relevant to the telephone call, without the need to click on a link or type information into the user interface.

The system uses an audio streaming server and speech-to-text converter to convert words spoken on a telephone call to text. The system uses a call manager to manage the transcription and identification of callers and call recipients. The call manager can identify callers and call recipients based on recognizing phone numbers connected through the telephone call. The call manager can provide transcribed text to a card server. The card server can retrieve information cards relevant to recognized keywords in the text. Based on mapping data that correlates users, phone numbers, user computing devices, and application IDs, the card server can provide the information cards to the appropriate user, e.g., the caller, the call recipient, or both. The caller and the call recipient can each receive the information cards on an electronic device. In some implementations, this functionality provides a stream of information related to the call, presented and updated in real-time with the flow of the conversation. For example, each participant in the call can receive information cards that the system determines to be related to his or her own utterances and/or utterances of the other participants for the call.

The system allows for significant customizability. Keywords can be specific to a user or the user's organization. For example, when the user is an employee of a company, the keywords of interest can be extracted from a database for the company. The keywords can additionally or alternatively be selected or filtered to keywords applicable to the specific user, e.g., keywords relevant to the user's role in the company. When one of the keywords is determined to be spoken on a telephone call, a server system obtains information related to the keyword. This information can include data retrieved from a database that has information specific to an organization associated with the user. For example, if the keyword refers to a customer of a user's company, status information, statistics, contact information, and other information about the customer's account with the company can be provided from the company's database.

The type of information provided, as well as the data shown for those information types, can be customized for the user and organization. For example, a sales representative and a product engineer at the same company may be shown different types of information for the same keyword, due to their different roles. Similarly, two users in a company with the same role might be shown different information for the same keyword, due to the users having different types of previous interactions with the system. In general, the system can use machine learning techniques to predictively select which information to show to a particular user at a particular time for a given keyword, and how to organize the information.

The techniques described provide needed information to just the right user, time, and user interface where the information is needed. Delays are minimal because a caller and call recipient device can receive contents of the information cards during the telephone call, without user action.

The techniques discussed below also provide an efficient way to publish customized or database content to users. The keywords or keywords of interest to each organization can be set based on the database contents for the organization. For example, each organization can have its own set of customers, employees, suppliers, product names, and so on reflected in its database. Based on the database contents, keywords have a semantic meaning that is specific to that organization, which the system uses to tailor the display of information for members of the organization.

In this process, the organizations security policies are preserved. If a user does not have authorization to access a field or record from the database, the card server will enforce access restrictions and will not provide the information. Consequently, different users even within the same organization may be presented different sets of information for the same keyword, due to the users' differing roles, interaction histories, access authorizations, and other factors. In general, each user will log in to his or her associated devices, and the system will show each user only what the user is authorized to see (e.g., as indicated by permissions, security policies, authentication level, etc.)

In one general aspect, a method performed by one or more computers includes a method performed by one or more computers. The method includes: receiving, by the one or more computers, audio data indicating an utterance of a first participant during a call with a second participant; obtaining, by the one or more computers, text of the utterance of the first participant; identifying, by the one or more computers, an information card associated with the utterance based on the text of the utterance of the first participant; and providing, by the one or more computers, information card data causing the identified information card to be provided for presentation during the call by a device associated with the second participant.

In some implementations, the device associated with the second participant is a device that the second participant uses to participate in the call.

In some implementations, the second participant uses a first device to participate in the call, and the information card data causes the information card to be presented by a second device associated with the second participant that is not used to participate in the call.

In some implementations, identifying the information card associated with the utterance of the first participant includes: determining, based on the text of the utterance, that the utterance is associated with a particular topic; and identifying an information card associated with the particular topic.

In some implementations, identifying the information card associated with the utterance of the first participant includes: determining that the text includes a keyword or a synonym for the keyword. The keyword is associated with the information card.

In some implementations, the method includes determining an identity of the first participant; and populating the information card based on an identity of the first participant.

In some implementations, the method includes: authenticating the second participant; and determining a permission or authorization level for the second participant; and selectively including information in the information card based on the permission or authorization level for the second participant.

In some implementations, the first participant is a caller that initiates the call and the method includes: upon initiation of the call, identifying the caller; generating an initial information card that identifies the caller and includes information about the caller from a database of an organization of the second participant; and causing the initial information card to be provided for display by the device associated with the second participant in response to initiation of the call.

In some implementations, the method includes: receiving, by the one or more computers, audio data indicating a second utterance of the second participant during the call; obtaining, by the one or more computers, text of the second utterance of the second participant; identifying, by the one or more computers, a second information card associated with the second utterance based on the text of the second utterance of the second participant; and providing, by the one or more computers, information card data causing the second information card to be provided for presentation during the call by a device associated with the first participant.

In some implementations, receiving the audio data includes receiving audio data from an audio streaming server.

In some implementations, the method includes: obtaining a set of keywords that respectively correspond to different information cards; and providing the set of keywords to an automated speech recognition system that is configured to adjust its speech recognition based on received keywords. Obtaining text of the utterance of the first participant includes obtaining the text, from the automated speech recognition system, as a result of a speech recognition process adjusted based on the provided set of keywords.

In some implementations, the speech recognition system is configured to bias the selection of words for a transcription to increase a likelihood of selecting words included in the provided set of keywords.

Other embodiments of these and other aspects include systems, devices, and computer-readable media, which can be configured to cause the actions of the methods to be performed.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
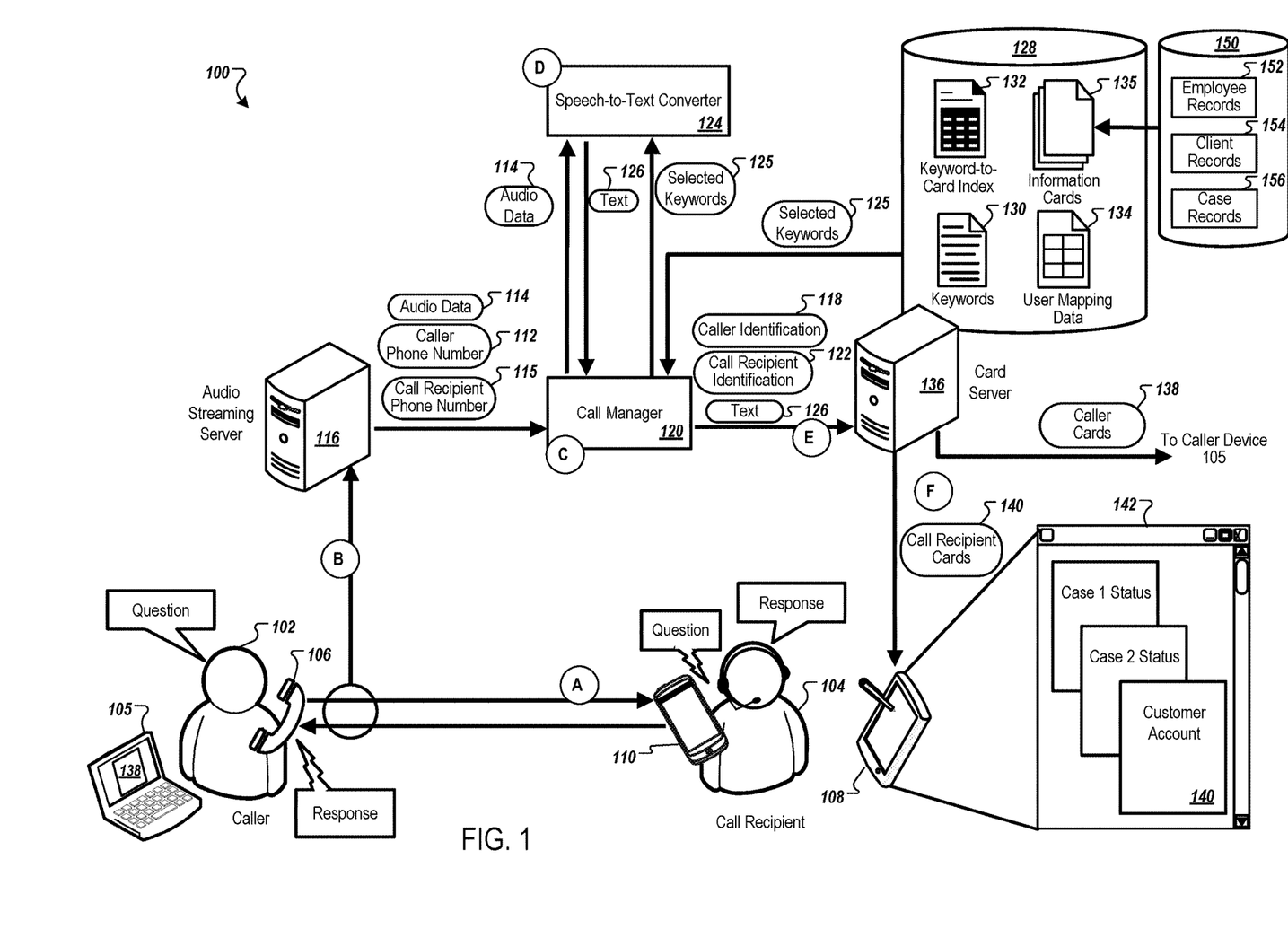
FIG. 1 is a diagram of an example system for call-based contextual delivery of content.

FIG. 1 is a diagram of an example system 100 for call-based contextual delivery of content. The system 100 includes a caller device 105, a caller telephone 106, a call recipient telephone 110, and a call recipient device 108. The system 100 also includes an audio streaming server 116, a call manager 120, a speech-to-text converter 124, and a card server 136.

The system 100 can identify spoken content of a telephone call between a caller 102 and a call recipient 104. Based on the spoken content, the system 100 can provide contextual information to the caller 102, the call recipient 104, or both, through a user interface. The information can be presented through digital information cards 135 displayed on the caller device 105 and/or the call recipient device 108. The digital information cards 135 can be displayed without the caller 102 or the call recipient 104 performing any user action.

The system 100 uses the audio streaming server 116 to stream audio data 114 representing speech from the telephone call to a call manager 120. The call manager 120 sends the audio data 114, and selected keywords 125 related to the caller 102 and the call recipient 104, to a speech-to-text converter 124. The speech-to-text converter 124 performs customized speech recognition to convert the audio data 114 to text 126. The call manager 120 provides the text 126 to a card server 136. The card server 136 retrieves information cards 135 relevant to recognized keywords 130 in the text 126. The card server 136 provides caller cards 138 to the caller device 105, and call recipient cards 140 to the call recipient device 108.

In the example of FIG. 1, the system 100 causes content relevant to the call to be presented on the caller device 105 and the call recipient device 108. These devices 105, 108 may be different from the devices used in the call, e.g., telephones 106, 110, as shown in FIG. 1. Contextually relevant content may be provided for display by the devices used in the call, e.g., telephones 106, 110, in addition to or instead of being displayed by other devices 105, 108.

The caller device 105 and call recipient device 108 can each be, for example, a desktop computer, laptop computer, smart phone, tablet, or other electronic device that can display information cards through a user interface. The caller device 105 and the call recipient device 108 each include a software application that enables the caller device 105 and the call recipient device 108 to dynamically display contextually-relevant information cards. The caller telephone 106 and the call recipient telephone 110 can each be any device that can place and/or receive audio voice calls.

The card server 136 has access to a database 128 for an organization. The card server 136 may be implemented using multiple computers that cooperate to perform the functions discussed below, and which may be located remotely from each other.

A caller 102 and a call recipient 104 can authenticate to the software application using a web browser extension or add-on. The caller 102 and the call recipient 104 may log in to the software application by entering a username and password, or alternatively authenticate in another form, e.g., through biometric data entry, entry of a PIN code, etc. Authentication can be used to verify the credentials of the caller 102 and call recipient 104. Once authenticated, the caller 102 and call recipient 104 can access information from the database 128.

The user mapping data 134 is stored in the database 128. The user mapping data 134 can include telephone number to user mapping data, and device to user mapping data. Examples of the user mapping data 134 are described in greater detail with reference to FIG. 2. Within the user mapping data 134, the caller device 105 and the number of the caller telephone 106 are associated with the caller 102. The call recipient device 108 and the number of the call recipient telephone 110 are associated with the call recipient 104.

The database 128 represents database records stored by or for the organization. The database records can include, for example, employee records, client records, product records, and case records. The records are not publicly available and are subject to data access restrictions, such as requirements that users be issued credentials from the organization that grant authorization to access the records. Different users may be granted different levels of authorization, and the card server 136 enforces access restrictions so that each user is only allowed to access the subsets of information the user is authorized to access.

FIG. 1 illustrates various operations and flows of data represented as stages (A)-(F), which can be performed in the order shown or in a different order.

In stage (A), the caller 102 uses the caller telephone 106 to call the call recipient 104 via the call recipient telephone 110. The caller 102 and the call recipient 104 speak to each other over the telephone call. In some implementations, the caller 102 may be a customer of a business, and the call recipient 104 may be a customer representative of the business. The telephone call may include the caller 102 asking questions, and the call recipient 104 providing responses.

In stage (B), the audio streaming server 116 streams audio from the telephone call. The audio streaming server 116 can collect audio data 114 representing speech from the telephone call. The audio data 114 can include spoken audio from both the caller 102 and the call recipient 104.

The audio streaming server 116 can also identify the caller telephone number 112 and the call recipient telephone number 115. The audio streaming server 116 sends the audio data 114, caller telephone number 112, and call recipient telephone number 115 to the call manager 120.

The call manager 120 can be, for example, a web socket that connects the audio streaming server 116 with the speech-to-text converter 124 and the card server 136. In some implementations, the call manager 120 can run in a cloud server. In some implementations, the call manager 120 can be a serverless program.

In stage (C), the call manager 120 identifies the caller identification 118 and the call recipient identification 122 based on the caller telephone number 112 and the call recipient telephone number 115. To identify the caller identification 118 and the call recipient identification 122, the call manager 120 can access the user mapping data 134 in the database 128.

The call manager 120 retrieves selected keywords 125 from the database 128. The keywords 130 can be set by an administrator for the system 100. In some implementations, the set of keywords 130 is generated by the card server 136, for example, by pulling keywords from a portions of a database or other data source. For example, the card server 136 may access database tables that list entity names (e.g., for competitors, suppliers, partner organization, employees, customer contacts, etc.) as well as abbreviations and/or nicknames for them.

Based on the identity and role of the caller 102 and the call recipient 104, the card server 136 may filter the list. For example, the card server 136 may limit the extracted set of keywords to those having information determined to be relevant to the role of the caller 102 and also those for which the caller 102 has security permissions to access corresponding data. The set of keywords may be further limited to keywords for types of entities for which appropriate information card templates have been defined. The filtered list of keywords can then be provided to the caller device 105 and/or the call recipient device 108, as appropriate.

The call manager 120 retrieves selected keywords 125 that are applicable for the caller 102 and the call recipient 104. For example, the call manager 120 can retrieve selected keywords 125 associated with the caller telephone number 112 and the call recipient telephone number 115. Example selected keywords 125 can include names and organizations of the caller 102 and the call recipient 104.

The call manager 120 provides the selected keywords 125 to a speech-to-text converter 124. The call manager 120 also provides audio data 114 from the telephone call to the speech-to-text converter 124.

In stage (D), the speech-to-text converter 124 converts the audio data 114 to text 126. The speech-to-text converter 124 transcribes the speech in real-time during the telephone call. The speech-to-text converter 124 can be customized, or biased, based on the selected keywords 125 provided by the call manager 120.

The speech-to-text converter 124 can bias the speech-to-text conversion using the selected keywords 125. For example, a caller may have a name that has multiple spellings, e.g., Matthieu may also be spelled "Matthew" or "Mathew." Based on the caller telephone number 112, the call manager 120 can retrieve "Matthieu" as a selected keyword 125. The speech-to-text converter 124 can bias the speech-to-text conversion using the selected keyword "Matthieu." Thus, when converting the spoken name of the caller to text, the speech-to-text converter is more likely to output "Matthieu" than to output "Matthew" or "Mathew."

The speech-to-text converter 124 outputs the text 126. The text 126 can be output as short strings that are frequently sent to the call manager 120. The text 126 is a text translation of the audio data 114. The speech-to-text converter 124 provides the text 126 to the call manager 120.

In stage (E), the call manager 120 provides the text 126, caller identification 118, and call recipient identification 122 to the card server 136. The card server 136 has access to the database 128 that includes the keywords 130, information cards 135, and a keyword-to-card index 132. The database 128 also includes the user mapping data 134.

The information cards 135 can be digital information cards that can be displayed on a user interface. The information cards 135 can include a snapshot of information related to, for example, a person, an organization, a process, or a location. There can be multiple categories of cards. Example categories of information cards 135 for a business can include employee cards, client cards, case cards, and schedule cards.

Each category of information card 135 can include a template that is filled with data from a records database 150. For example, the records database 150 can include employee records 152, client records 154, and case records 156. A template for an employee information card 135 can include an employee name, position, phone number, and supervisor's name. To generate an employee information card 135, the card server 136 can populate the template with information from the employee records 152 of the records database 150. Similarly, a template for a client information card 135 can include the client's company name, account number, and contact information. To generate a client information card 135, the card server 136 can populate the template with information from the client records 154 of the records database 150. In some implementations, an information card 135 can include information that can be edited by a user. For example, the call recipient 104 may be able to update contact information for the caller 102 by editing a contact information card for the caller 102.

The keyword-to-card index 132 is an index that maps the keywords 130 to the information cards 135. In some implementations, a single keyword 130 maps to a single information card 135. For example, a case number may be a keyword 130 that maps to a single information card 135 for the specific case. In some implementations, a keyword 130 may map to many information cards 135. For example, a first name may be a keyword 130 that maps to many information cards 135 that include names of employees, clients, etc.

The card server 136 compares the text 126 to the keywords 130 to identify matching keywords 130 within the text 126. When the card server 136 identifies one or more matches, the card server 136 identifies corresponding information cards 135 using the keyword-to-card index 132. In some implementations, the card server 136 also examines the text 126 to identify and include other contextual factors that may be of interest (which may be different from the keywords 130 of interest), such as words indicating a time or a geographical location, or a task of the caller 102. Various words and phrases indicating an overall subject or topic of the telephone call may also be extracted and used to identify corresponding information cards 135.

In some implementations, the card server 136 can use context information to improve accuracy of retrieving information cards 135. For example, a telephone call may include speech that includes the words "Case 655." Based on transcribed speech from the telephone call, the card server 136 retrieves a card for Case 655. The card for Case 655 may include information indicating that employee Martha Smith is responsible for Case 655. Speech from the telephone call may further include the word "Martha." Since the name Martha Smith appears on the card for Case 655, the card server 136 can bias keyword matching in favor of a card for "Martha Smith," over other cards that include the word "Martha."

Once the card server 136 identifies information cards 135 corresponding to keywords 130, the card server 136 retrieves the relevant information cards 135 from the database 128.

In stage (F), the card server 136 provides the information cards 135 to the caller device 105 and the call recipient device 108. Specifically, the card server 136 provides caller cards 138 to the caller device 105. The card server 136 provides call recipient cards 140 to the call recipient device 108. The card server 136 can determine to send the caller cards 138 to the caller device 105, and the call recipient cards 140 to the call recipient device 108, based on the user mapping data 134.

In some implementations, the system is configured to provide information cards to a recipient of a call upon connection of the call, to indicate an identity of the caller. In addition, the information card can provide other information about the caller, such as account information, user profile information, recent history information (e.g., indicating recent communications or activities of the caller), and so on. In some implementations, the system can use information about the caller to predict or infer a likely reason for the call. For example, the call manager 120 and/or card server 136 may determine that records about a caller indicate a previous interaction regarding a particular product or issue, and so the system can present, along with a card identifying the caller, a card indicating the particular product or issue. As another example, upon receipt of a call, the call manager 120 and/or card server 136 may examine calendar data and determine that there is an upcoming meeting scheduled that includes the caller and call recipient, and so the system may present to the call recipient a card that provides information about the upcoming meeting. This additional information can be provided predictively, e.g., even before the topic of the card is mentioned during the call.

In some implementations, the types of cards that are selected for display are determined using one or more machine learning models that are trained based on data access patterns of one or more users. For example, data indicating topics and/or keywords and corresponding entities, documents, data types, and data fields can be obtained. This may include search histories, browsing histories, document access histories, and so on. From these examples, one or more models, such as neural networks, can be trained to learn associations between keywords and topics with entities, documents, data types, and data fields. The trained models can then be used to predict, given keywords and/or topics of utterances during a call, the information to be presented on information cards during a call. The predictions can be updated repeatedly over the course of the call, for example, as transcriptions of new utterances are received and new keywords are identified.

Figure 2:
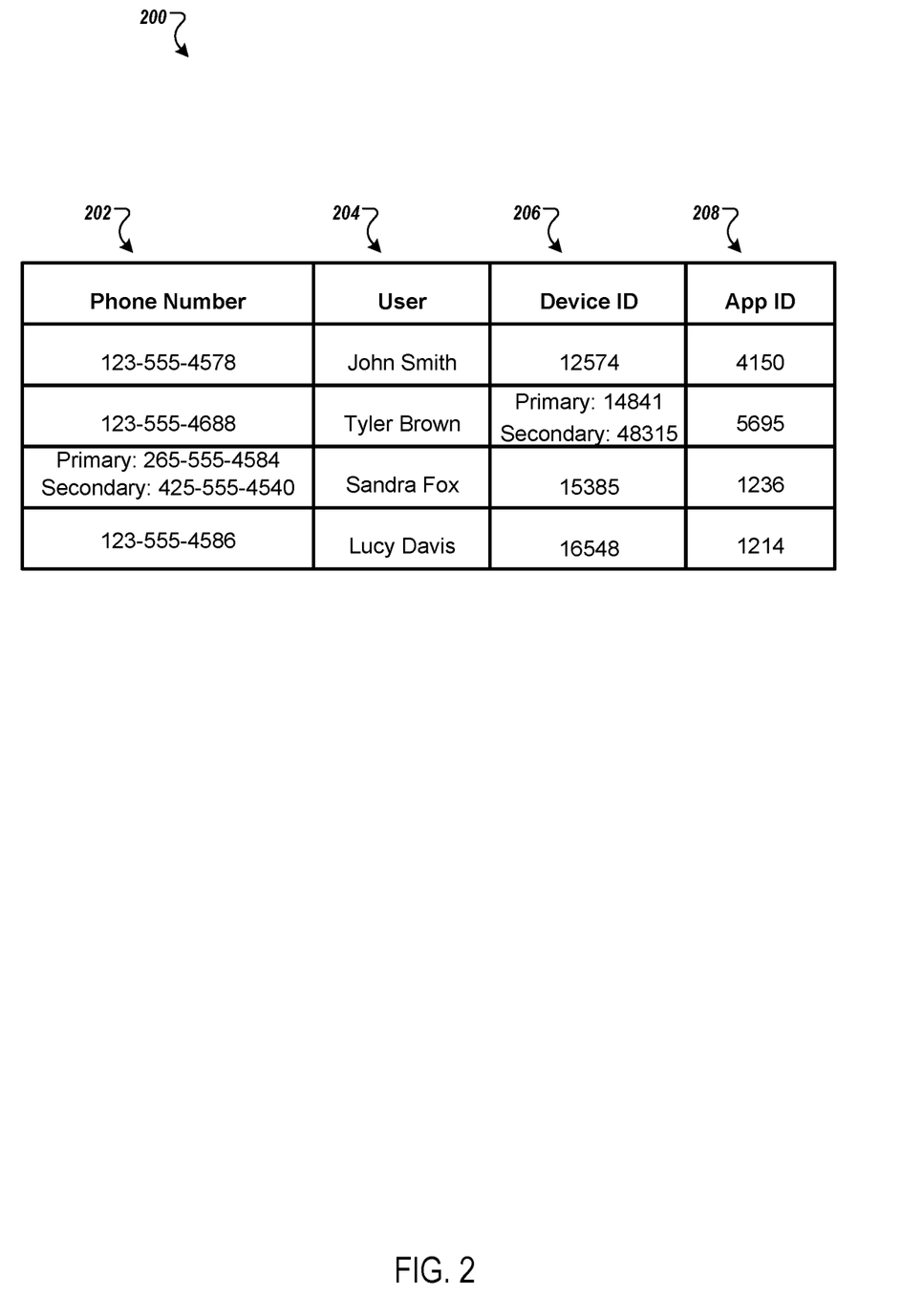
FIG. 2 illustrates an example table of user mapping data.

FIG. 2 illustrates an example table 200 of user mapping data 134. The user mapping data 134 can include phone numbers 202, user names 204, Device IDs 206, and Application IDs 208. The users can be, for example, clients or employees of an organization. Each user can be mapped to one or more phone number 202, device ID 206, and Application ID 208. In some implementations, a user may have a primary phone number and a secondary phone number and/or a primary Device ID and a secondary Device ID.

As an example, the user John Smith may initiate a phone call from phone number 123-555-4578. John Smith is logged in to the software application on an electronic device with Device ID 12574, with application ID 4150. The call manager 120 can associate the phone number 123-555-4578 with the user John Smith. When the card server 136 retrieves the information cards 135 based on the telephone call, the card server 136 can determine where to sends the information cards 135 based on the user mapping data 134. In this example, the card server 136 can determine to send the information cards 135 to the device with Device ID 12574.

The user Tyler Brown has a primary and secondary Device ID. When the card server 136 retrieves the information cards 135 based on a telephone call from Tyler Brown, the card server can determine if the application ID 5695 is logged in to the primary device or the secondary device. The card server 136 can then determine to send the information cards 135 to the device on which Tyler Brown is logged in to the application.

Referring back to FIG. 1, the caller device 105 receives the caller cards 138 from the card server 136. The caller cards 138 can be displayed on the user interface of the caller device 105. The caller cards 138 can be displayed in sequence. For example, a first caller card 138 can be displayed based on a first keyword 130. Subsequently, a second caller card 138 can be displayed based on a second keyword 130. In some implementations, the first caller card 138 and the second caller card 138 may be displayed so that the caller 102 can view both caller cards 138 simultaneously. In some implementations, the first caller card 138 and the second caller card 138 may be overlapping. The caller 102 can select to view individual caller cards 138, for example, by clicking on an individual caller card 138 or by swiping to view an individual caller card 138.

Similarly, the call recipient device 108 receives the call recipient cards 140. The call recipient cards 140 can be displayed for viewing by the call recipient 104 on a user interface 142 of the call recipient device 108. For an example call recipient 104 who is a customer service representative, the call recipient cards 140 can include information related to customer accounts and customer cases.

The system can provide very low latency for users to receive information regarding keywords 130 spoken during a telephone call. The card server 136 can identify keywords 130 from the transcribed text 126 and can obtain information cards 135 automatically during the telephone call. Consequently, when a user speaks a keyword 130, the corresponding information card 135 can be displayed very quickly, often within a second or less. This provides users a very fast response while also allowing access to the information from the database 128 without having to interact with a user interface, e.g., by clicking a computer mouse button.

The card server 136 may apply security policies when selecting which information cards 135 to provide to the caller device 105 and the call recipient device 108. For example, security policies may limit access to certain databases or portions of databases, and the card server 136 may determine whether the caller 102 and/or the client recipient 104 has sufficient access privileges before providing information cards 135 that depend on data that the caller 102 is not authorized to access. If the card server 136 determines that the caller 102 and/or the call recipient 104 is not authorized to access the information card 135, the card server 136 does not provide the information card 135.

Figure 3:
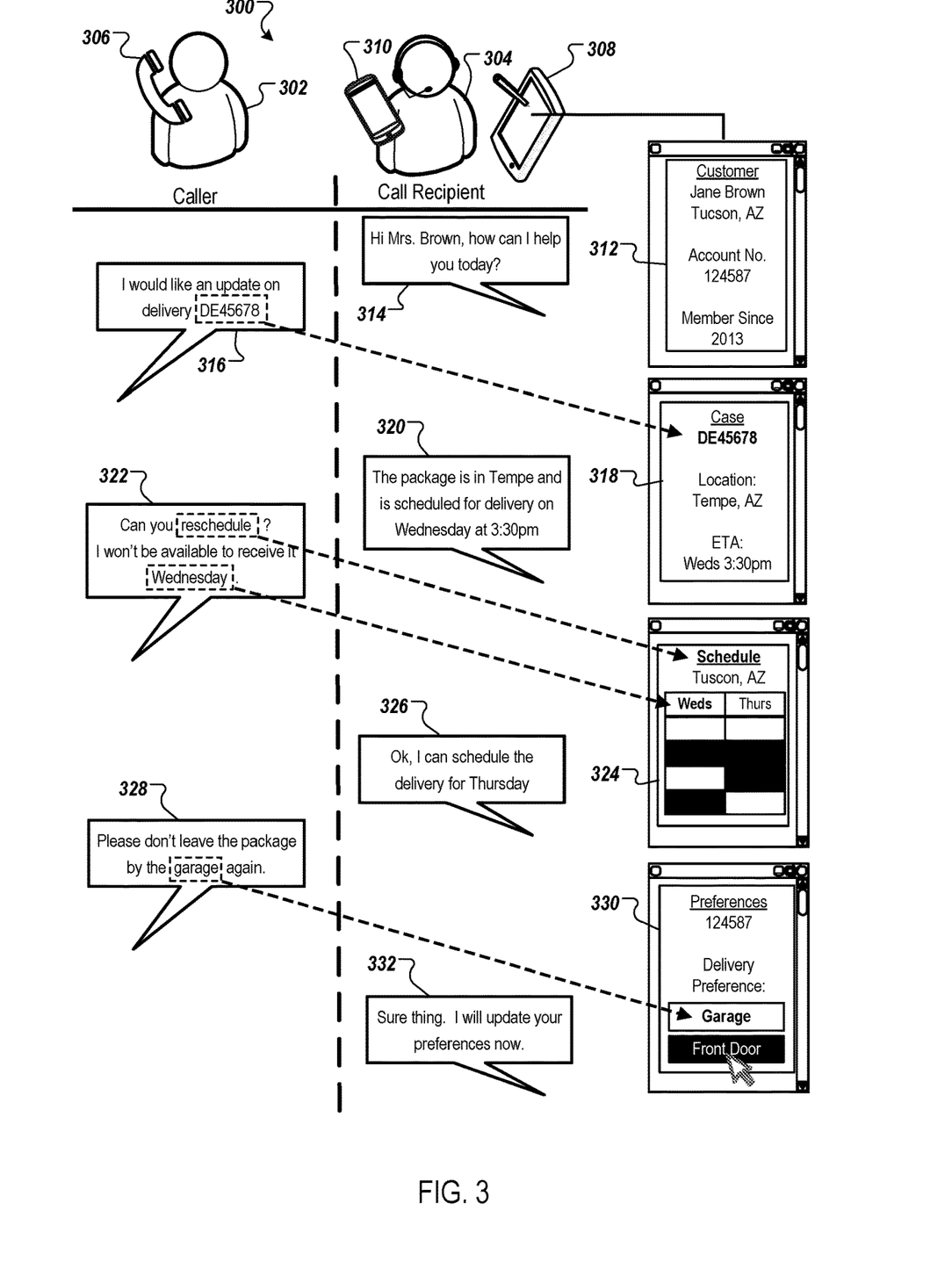
FIG. 3 illustrates an example telephone call with user interfaces displaying information cards to one user based on the telephone call.

FIG. 3 illustrates an example telephone call 300 with user interfaces displaying information cards based on the telephone call.

The telephone call 300 is between a caller 302 and a call recipient 304. In this example, the caller 302 is a customer of a company that provides shipping and delivery services. The call recipient 304 is a customer service representative of the company.

The caller 302 places the telephone call 300 to the call recipient 304 using a caller telephone 306. The call recipient 304 receives the telephone call 300 on a call recipient telephone 310. The call recipient 304 is logged in to a software application that enables a call recipient device 308 to dynamically display contextually-relevant information cards.

When the telephone call 300 connects between the caller telephone 306 and the call recipient telephone 310, the call recipient device 308 displays a customer information card 312 for the call recipient 304. For example, the call manager 120 accesses the user mapping data 134 to link a user to the caller's telephone number. Based on the caller's telephone number, the call manager 120 determines the caller identification 118. The call manager 120 provides the card server 136 with the caller identification 118, and the card server 136 retrieves the relevant customer information card 312.

The customer information card 312 includes information such as the customer's name, Jane Brown, location, Tucson, Ariz., and account number.

With the customer information card 312 displayed on the call recipient device 308, the call recipient 304 can greet the caller 302 by name at interaction 314. At interaction 316, the caller 302 asks for an update on a delivery with a serial number DE45678. The call manager 120 sends audio data 114 of the caller's query to the speech-to-text converter 124. The speech-to-text converter 124 converts the speech "DE45678" and surrounding speech to text 126.

The call manager 120 sends the text 126 to the card server 136. The card server 136 searches the keywords 130 for a match to "DE45678." The card server 136 identifies a keyword 130 that matches "DE45678." The card server 136 references the keyword-to-card index 132 to identify relevant information cards 135. The card server 136 identifies a relevant case card 318 for case number DE45678.

The card server 136 retrieves the case card 318 for case number DE45678. Based on the call recipient's role and access level, the card server 136 determines that the call recipient 304 has access to the information on the case card 318. The card server 136 sends the case card 318 to the call recipient device 308.

The call recipient 304 views the case card 318. The case card 318 includes a current location of Tempe, Ariz., for the package to be delivered, and an estimated time of arrival in Tucson on Wednesday. At interaction 320, the call recipient 304 informs the caller 302 of the status of the delivery, including that the package is scheduled for delivery on Wednesday.

At interaction 322, the caller 302 asks to reschedule the delivery, because the caller 302 will not be available on Wednesday. The card server 136 identifies spoken keywords "reschedule" and "Wednesday." The card server 136 searches the database 128 for information related to the keywords "reschedule" and "Wednesday." The card server 136 can bias the search toward context information related to recently accessed cards, e.g., the customer information card 312 that includes a location of Tucson, Ariz. Based on context information from the previously accessed customer information card 312, the card server 136 more specifically searches for schedule information related to deliveries in Tucson, Ariz. around Wednesday. The schedule information may come from a shipping schedule database that includes available delivery times within a geographic area. The card server 136 retrieves a schedule card 324 for Tucson on Wednesday and following days. The schedule card 324 displays on the call recipient device 308.

The call recipient 304 views the schedule card 324, including availabilities for Wednesday and Thursday. At interaction 326, the call recipient 304 informs the caller 302 that there is an availability on Thursday.

At interaction 328, the caller 302 requests that the package not be left by the garage. The card server 136 identifies the spoken keyword "garage." The card server 136 searches the database 128 for information related to the keyword "garage." The card server 136 can bias the search toward context information related to recently accessed cards, e.g., the customer information card 312 that includes the name Jane Brown and the customer account number 124587. Based on context information from the customer information card 312, the card server 136 more specifically searches for information including the keyword "garage" that is related to deliveries for the customer Jane Brown with account number 124587.

The card server 136 retrieves a preference card 330 for Jane Brown that includes the word "garage." The preference card 330 includes an option to deliver packages to the garage or to the front door. At interaction 332, the call recipient 304 informs the caller 302 that he will edit the preference card 330 to update the caller's delivery preferences from the garage to the front door. The call recipient 304 can update the customer's preferences by editing the preference card 330.

Figure 4:
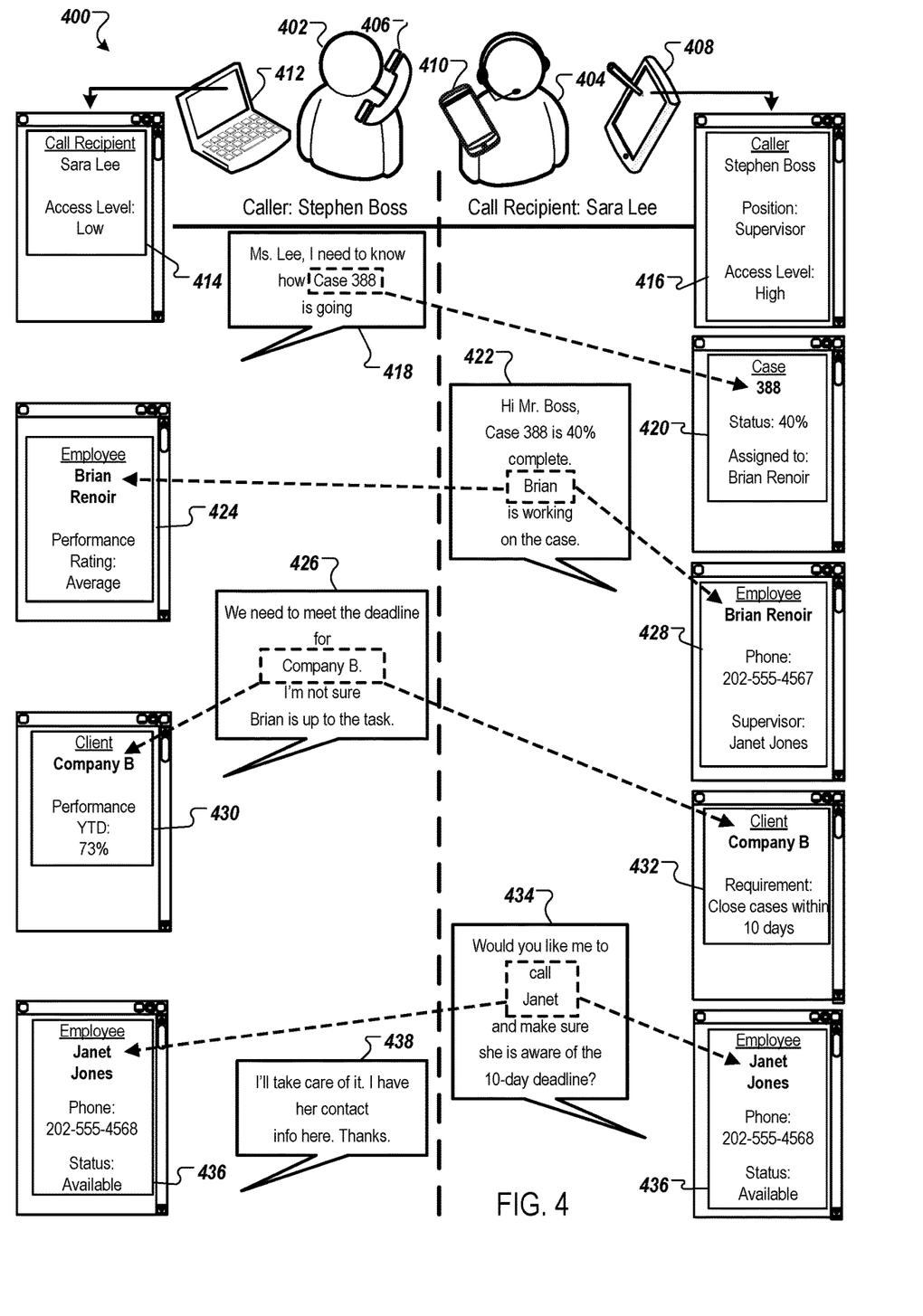
FIG. 4 illustrates an example telephone call with user interfaces displaying information to two users based on the telephone call.

FIG. 4 illustrates an example telephone call 400 with user interfaces displaying information to two users based on the telephone call.

The telephone call 400 is between a caller 402 and a call recipient 404. In this example, the caller 402 is a supervisor at a company named Stephen Boss. The call recipient 404 is an employee of the company named Sara Lee.

The caller 402 places the telephone call 400 to the call recipient 404 using a caller telephone 406. The call recipient 404 receives the telephone call 400 on a call recipient telephone 410. The caller 402 and the call recipient 404 are each logged in to a software application. The caller 402 is logged in to the software application on a caller device 412, while the call recipient is logged in to the software application on a call recipient device 408. The software application enables the caller device 412 and the call recipient device 408 to dynamically display contextually-relevant information cards.

When the telephone call 400 connects between the caller telephone 406 and the call recipient telephone 410, the call recipient device 408 displays a caller information card 416 for the caller 402. For example, the call manager 120 accesses the user mapping data 134 to link a user to the caller's telephone number. Based on the caller's telephone number, the call manager 120 determines the caller identification 118. The call manager 120 provides the card server 136 with the caller identification 118, and the card server 136 retrieves the relevant caller information card 416. The caller information card 416 includes information such as the caller's name, position, and access level. For example, the caller information card 416 indicates that the caller's name is Stephen Boss, his position is a supervisor, and his access level is high.

Similarly, when the telephone call 400 connects between the caller telephone 406 and the call recipient telephone 410, the caller device 412 displays a call recipient information card 414 for the caller 402. The call recipient information card 414 includes information such as the call recipient's name and access level. For example, the call recipient information card 414 indicates that the call recipient's name is Sara Lee, and her access level is low.

At interaction 418, the caller 402 asks for a status of Case 388. The call manager 120 sends audio data 114 of the caller's query to the speech-to-text converter 124. The speech-to-text converter 124 converts the speech "Case 388" and surrounding speech to text 126.

The call manager 120 sends the text 126 to the card server 136. The card server 136 searches the keywords 130 for a match to "Case 388." The card server 136 identifies a keyword 130 that matches "Case 388." The card server 136 references the keyword-to-card index 132 to identify relevant information cards 135. The card server 136 identifies a relevant case card 420 for Case 388.

The card server 136 retrieves the case card 420 for Case 388 and designates the card as a call recipient card 140. The card server 136 sends the case card 420 to the call recipient device 408.

With the caller information card 416 and the case card 420 displayed on the call recipient device 408, the call recipient 404 can greet the caller 402 by name and provide a status of Case 388. The call recipient 404 views the case card 420, including percentage complete and assigned personnel. At interaction 422, the call recipient 404 informs the caller 402 of the status of Case 388. The call recipient 404 informs the caller 402 that Brian is working on the case.

The card server 136 identifies the spoken keyword "Brian." In some implementations, there may be more than one employee card for an employee named Brian. The card server 136 can bias the keyword search for keywords related to recently accessed cards. For example, the case card 420 for Case 388 includes the words "Brian Renoir." The card server 136 can therefore bias the keyword search towards Brian Renoir over other employee cards that include the word "Brian." The card server 136 retrieves employee cards 424 and 428 for Brian Renoir.

The card server 136 can provide multiple versions of cards. For example, the employee cards 424 and 428 are both cards for the same employee, "Brian Renoir," but the two cards 424, 428 include different information. The employee card 424 includes the employee's performance rating, while the employee card 428 does not include the employee's performance rating.

The card server 136 can provide cards to individual users based on a number of factors, e.g., a user's role, preferences, and access permissions. For example, the caller 402 is a supervisor with a high access level that permits the caller 402 to access employee performance data. The caller 402 may select a preference that when the card server 136 provides employee cards to the caller 402, the employee cards should include the employees' performance ratings. The call recipient 404 has a low access level. The call recipient 404 therefore does not have the option of viewing employee cards that include employees' performance ratings. Thus, based on the accesses and preferences of the caller 402 and the call recipient 404, the card server 136 can determine to send the employee card 424 to the caller 402 and to send the employee card 428 to the call recipient 404.

The employee card 424 for Brian Renoir displays on the caller device 412. The employee card 424 includes the employee's name and performance rating. The employee card 428 for Brian Renoir displays on the call recipient device 408. The employee card 428 includes the employee's name, telephone number, and supervisor's name "Janet Jones."

The caller 402 views the employee card 424, including the employee's performance rating of average. At interaction 426, the caller 402 informs the call recipient 404 that Brian may not be up to the task of meeting the deadline for Company B.

The card server 136 identifies the spoken keyword "Company B." The card server 136 retrieves client cards 430 and 432 for Company B. The client cards 430 and 432 are both cards for the same client, "Company B," but the two cards 430, 432 include different information. The client card 430 includes the year-to-date performance success rate for Company B, while the client card 432 does not include the performance success rate. The client card 432 instead includes a requirement for Company B that cases are closed within 10 days The card server 136 can provide the client cards 430, 432 to individual users based on the user's role, preferences, and access permissions. For example, the caller 402 may have access to the performance success rate. The caller 402 may select a preference that when the card server 136 provides client cards to the caller 402, the client cards should include the performance success rate. The call recipient 404 may not have access to the performance success rate. The call recipient 404 may select a preference that when the card server 136 provides client cards to the call recipient 404, the client cards should include the client's timeliness requirements. Thus, based on the accesses and preferences of the caller 402 and the call recipient 404, the card server 136 can determine to send the client card 430 to the caller 402 and to send the client card 432 to the call recipient 404.

At interaction 434, the call recipient 404 offers to call Brian's supervisor, "Janet." The card server 136 identifies the spoken keywords "call" and "Janet." The card server 136 searches the database 128 for information related to the keywords "call" and "Janet." The card server 136 can bias the search for keywords related to recently accessed cards, e.g., the employee card 428 that includes the supervisor's name "Janet Jones." Thus, though the call recipient 404 did not speak Janet's last name, the card server 136 can search for information related to Janet Jones. Additionally, based on the keyword "call," the card server 136 can determine to focus the search on contact information and availability of Janet Jones.

The card server retrieves an employee contact card 436 for Janet. The employee contact card 436 includes Janet's name, telephone number, and availability. Both the caller 402 and the call recipient 404 have access to employee contact information, therefore the employee contact card 436 is displayed on both the caller device 412 and the call recipient device 408. At interaction 438, the caller 402 informs the call recipient 404 that he sees Janet's contact information and will call Janet.

Figure 5:
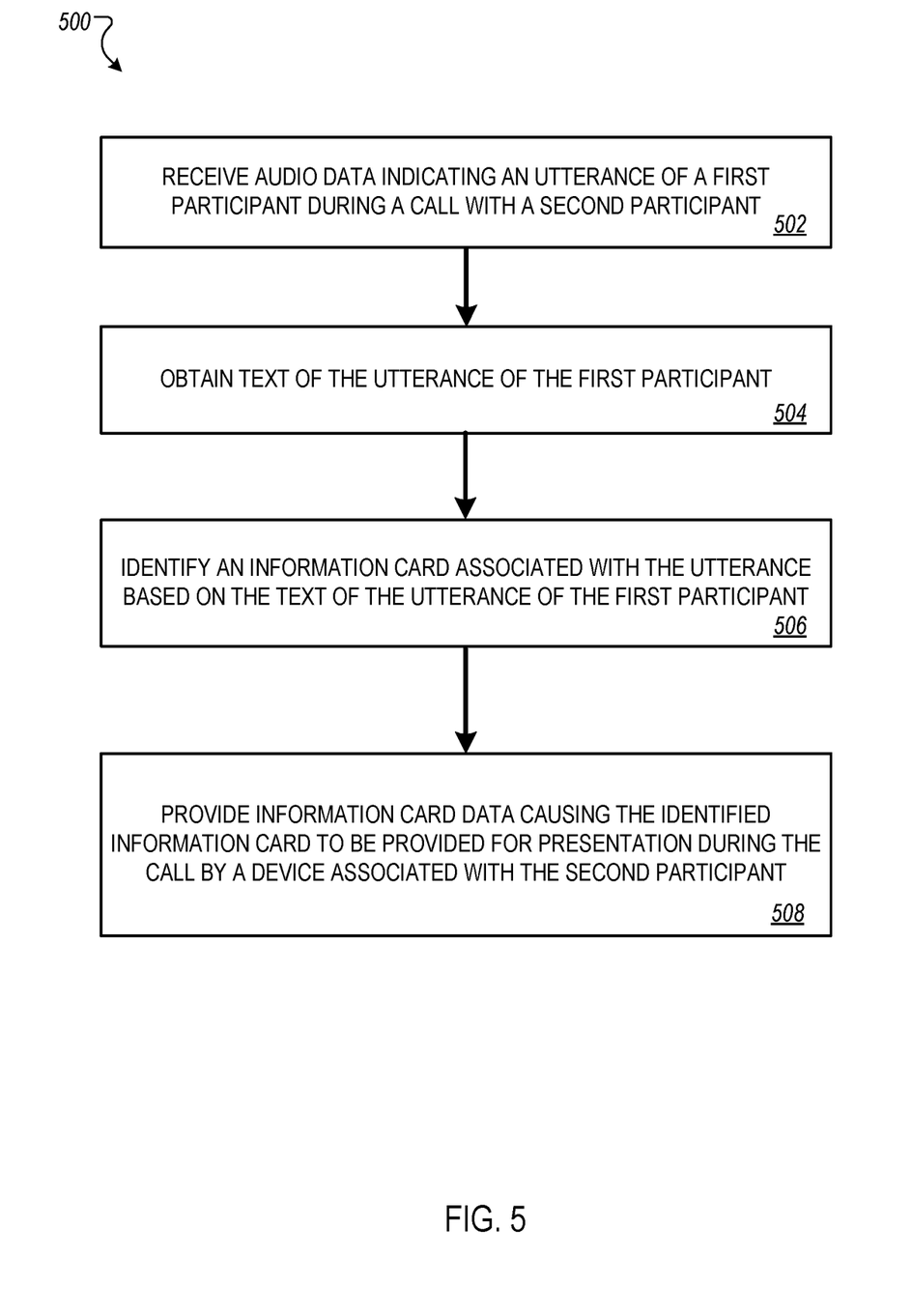
FIG. 5 is a flow diagram showing an example of a process for call-based contextual delivery of content.

FIG. 5 is a flow diagram showing an example of a process 500 for call-based contextual delivery of content. Briefly, a system of one or more computers may receive audio data indicating an utterance of a first participant during a call with a second participant. The system may obtain text of the utterance of the first participant, e.g., using speech-to-text converter. The system may identify an information card associated with the utterance. The system may provide information card data, causing the information card to be provided for presentation during the call. The information card may be presented by a device associated with the second participant.

The system receives audio data indicating an utterance of a first participant during a call with a second participant (502). The first participant may be a caller that initiates the call. The system may receive the audio data from an audio streaming server. The system may also receive audio data indicating a second utterance of the second participant during the call.

The system obtains text of the utterance of the first participant (504). The system may obtain the text from a speech recognition system. The speech recognition system may be configured to bias the selection of words for a transcription to increase the likelihood of selecting words included in a provided set of keywords. The system may obtain the set of keywords, e.g., from a database. The keywords may respectively correspond to different information cards. The system may provide the set of keywords to the automated speech recognition system that is configured to adjust its speech recognition based on received keywords. Obtaining text of the utterance of the first participant can include obtaining the text, from the automated speech recognition system, as a result of a speech recognition process adjusted based on the provided set of keywords. The system may also obtain text of the second utterance of the second participant.

The system identifies an information card associated with the utterance based on the text of the utterance of the first participant (506). Identifying the information card may include determining, based on the text of the utterance, that the utterance is associated with a particular topic. The system can identify the information card associated with the particular topic. The system may also identify a second information card associated with the second utterance based on the text of the second utterance of the second participant.

In some cases, identifying the information card associated with the utterance of the first participant includes determining that the text includes a keyword, or a synonym for the keyword, that is associated with the information card.

The system provides information card data causing the identified information card to be provided for presentation during the call by a device associated with the second participant (508). In some cases, the device associated with the second participant may be a device that the second participant uses to participate in the call. In some cases, the second participant may use a first device to participate in the call, and the information card data may cause the information card to be presented by a second device associated with the second participant that is not used to participate in the call.

In some cases, the system may determine an identity of the first participant, and may populate the information card based on the identity of the first participant. In some cases, the system may authenticate the second participant and may determine a permission or authorization level for the second participant. The system may selectively include information in the information card based on the permission or authorization level for the second participant.

In some cases when the first participant is a caller, upon initiation of the call, the system may identify the caller. The system may generate an initial information card that identifies the caller. The initial information card may also include information about the caller from a database of an organization of the second participant. The system may cause the initial information card to be provided for display by the device associated with the second participant, in response to initiation of the call.

In some cases, the system may identify a second information card associated with the second utterance based on the text of the second utterance of the second participant. The system may provide information card data, causing the second information card to be provided for presentation during the call by a device associated with the first participant.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
receiving, by the one or more computers, audio data indicating an utterance of a first participant during a call with a second participant;
obtaining, by the one or more computers, text of the utterance of the first participant;
storing, by the one or more computers, data indicating a set of keywords, wherein each keyword of the set of keywords is associated with at least one information card;
identifying, by the one or more computers, a portion of the text of the utterance of the first participant that matches a particular keyword of the set of keywords;
identifying, by the one or more computers, multiple information cards associated with the particular keyword;
selecting, by the one or more computers, a first information card from the multiple information cards based at least in part on (i) a role or identity of the second participant, (ii) content retrieved from a database based on one or more words in the text of the utterance of the first participant other than the particular keyword, and (iii) content of one or more previous information cards that were presented during the call or one or more previous calls involving the first participant;
populating, by the one or more computers, content of the first information card based on an authorization level of the second participant; and
providing, by the one or more computers, information card data causing the first information card to be provided for presentation during the call by a device associated with the second participant.

2. The method of claim 1, wherein the device associated with the second participant is a device that the second participant uses to participate in the call.

3. The method of claim 1, wherein the second participant uses a first device to participate in the call, and the information card data causes the first information card to be presented by a second device associated with the second participant that is not used to participate in the call.

4. The method of claim 1, wherein the first participant is a caller that initiates the call;
wherein the method includes:
upon initiation of the call, identifying the caller;
generating an initial information card that identifies the caller and includes information about the caller from a database of an organization of the second participant; and
causing the initial information card to be provided for display by the device associated with the second participant in response to initiation of the call.

5. The method of claim 1, comprising:
receiving, by the one or more computers, audio data indicating a second utterance of the second participant during the call;
obtaining, by the one or more computers, text of the second utterance of the second participant;
identifying, by the one or more computers, a portion of the text of the second utterance of the second participant that matches a second keyword of the set of keywords;
identifying, by the one or more computers, a second information card associated with the second keyword; and
providing, by the one or more computers, information card data causing the second information card to be provided for presentation during the call by a device associated with the first participant.

6. The method of claim 1, wherein receiving the audio data comprises receiving audio data from an audio streaming server.

7. The method of claim 1, comprising:
selecting, from the set of keywords, a subset of keywords based on an identity of the first participant; and
providing the subset of keywords to an automated speech recognition system that is configured to adjust its speech recognition based on received keywords;
wherein obtaining text of the utterance of the first participant comprises obtaining the text, from the automated speech recognition system, as a result of a speech recognition process adjusted based on the provided subset of keywords.

8. The method of claim 7, wherein the speech recognition system is configured to bias the selection of words for a transcription to increase a likelihood of selecting words included in the provided subset of keywords.

9. The method of claim 1, wherein the content of the first information card comprises data retrieved from a database of an organization of the second participant.

10. The method of claim 1, comprising selecting the first information card from the multiple information cards based in part on non-keyword text of the utterance of the first participant.

11. The method of claim 1, wherein the content of one or more previous information cards comprises content of one or more previous information cards that were provided for presentation to the second participant during the call based on one or more words uttered during the call.

12. The method of claim 1, wherein the first participant is a caller that initiates the call; and
wherein the content of the one or more previous information cards comprises content of one or more previous information cards that were selected during one or more previous calls initiated by the first participant.

13. The method of claim 1, wherein the one or more computers are configured to provide different information cards for presentation to the first participant and the second participant, wherein the method further comprises:
selecting, based on a second keyword identified in text of an utterance of the second participant during the call, a second information card associated with the second keyword; and
providing information card data causing the second information card to be provided for presentation during the call by a device associated with the first participant.

14. The method of claim 1, wherein selecting the first information card from among the multiple information cards comprises:
retrieving, from a database, an information card based on the one or more words other than the particular keyword; and
using content of the information card retrieved based on the one or more words other than the particular keyword to select the first information card from among the multiple information cards associated with the particular keyword.

15. The method of claim 1, wherein the one or more words other than the particular keyword indicate context for the use of the particular keyword, wherein the one or more other words indicate a time, location, or task mentioned in the text of the utterance of the first participant.

16. The method of claim 1, further comprising providing, for presentation to the second participant, content of one or more information cards that is selected based on output of a trained machine learning model, wherein the trained machine learning model generates the output based on input of (i) one or more words uttered in the call or (ii) an indication of a topic determined based on one or more words uttered in the call.

17. A system comprising:
one or more computers; and
one or more computer-readable media storing instructions that, when executed by the one or more computers, cause the one or more computers to perform operations comprising:
receiving, by the one or more computers, audio data indicating an utterance of a first participant during a call with a second participant;
obtaining, by the one or more computers, text of the utterance of the first participant;
storing, by the one or more computers, data indicating a set of keywords, wherein each keyword of the set of keywords is associated with at least one information card;
identifying, by the one or more computers, a portion of the text of the utterance of the first participant that matches a particular keyword of the set of keywords;
identifying, by the one or more computers, multiple information cards associated with the particular keyword;
selecting, by the one or more computers, a first information card from the multiple information cards based at least in part on (i) a role or identity of the second participant (ii) content retrieved from a database based on one or more words in the text of the utterance of the first participant other than the particular keyword, and (iii) content of one or more previous information cards that were presented during the call or one or more previous calls involving the first participant;
populating, by the one or more computers, content of the first information card based on an authorization level of the second participant; and
providing, by the one or more computers, information card data causing the first information card to be provided for presentation during the call by a device associated with the second participant.

18. The system of claim 17, wherein the device associated with the second participant is a device that the second participant uses to participate in the call.

19. The system of claim 17, wherein the second participant uses a first device to participate in the call, and the information card data causes the first information card to be presented by a second device associated with the second participant that is not used to participate in the call.

20. One or more non-transitory computer-readable media storing instructions that, when executed by the one or more computers, cause the one or more computers to perform operations comprising:
receiving, by the one or more computers, audio data indicating an utterance of a first participant during a call with a second participant;
obtaining, by the one or more computers, text of the utterance of the first participant;
storing, by the one or more computers, data indicating a set of keywords, wherein each keyword of the set of keywords is associated with at least one information card;
identifying, by the one or more computers, a portion of the text of the utterance of the first participant that matches a particular keyword of the set of keywords;
identifying, by the one or more computers, multiple information cards associated with the particular keyword;
selecting, by the one or more computers, a first information card from the multiple information cards based at least in part on (i) a role or identity of the second participant (ii) content retrieved from a database based on one or more words in the text of the utterance of the first participant other than the particular keyword, and (iii) content of one or more previous information cards that were presented during the call or one or more previous calls involving the first participant;
populating, by the one or more computers, content of the first information card based on an authorization level of the second participant; and
providing, by the one or more computers, information card data causing the first information card to be provided for presentation during the call by a device associated with the second participant.

* * * * *